United States Patent [19]
Schickler

[11] 3,828,172
[45] Aug. 6, 1974

[54] REPLENISHMENT CONTROLLER FOR PHOTOGRAPHIC PROCESSORS

[75] Inventor: Edward R. Schickler, Webster, N.Y.

[73] Assignee: Eastman Kodak Company, Rochester, N.Y.

[22] Filed: June 4, 1973

[21] Appl. No.: 366,904

[52] U.S. Cl......... 235/151.12, 23/230 R, 23/253 R, 95/89 R, 235/151.34
[51] Int. Cl. ............................................ G03d 3/06
[58] Field of Search............ 235/151.1, 151, 151.12, 235/151.3, 151.34; 96/50 R, 50 A, 66, 66.1, 66.4, 56.2, 60 BF, 60, 61, 48, 1 C; 95/89 R; 204/195 R, 109; 23/230 A, 230 R, 252 R, 253 R, 255 R, 255 E

[56] References Cited
UNITED STATES PATENTS

| | | | |
|---|---|---|---|
| 3,529,529 | 9/1970 | Schumacher | 95/89 R |
| 3,605,775 | 9/1971 | Zaander et al. | 235/151.12 X |
| 3,623,418 | 11/1971 | Ost | 95/89 R |
| 3,641,907 | 2/1972 | Cranskens et al. | 95/89 R |

*Primary Examiner*—Joseph F. Ruggiero
*Attorney, Agent, or Firm*—L. P. Kessler

[57] ABSTRACT

Control of chemical replenishment in a photographic processor is provided based on a calculation of the amount of image silver in the processed photographic product. To accomplish such control, an accounting is maintained of (1) the silver entering the processor in the product and of (2) the silver removed from the product during the fixing step as determined by a sensing device. From a determination of the difference between the entering and the removed silver, a demand signal is established which is representative of the image silver fixed during processing. Dispensing of fresh processing chemicals is performed responsive to the demand signal, thus providing replenishment related to the amount of processed image silver.

4 Claims, 1 Drawing Figure

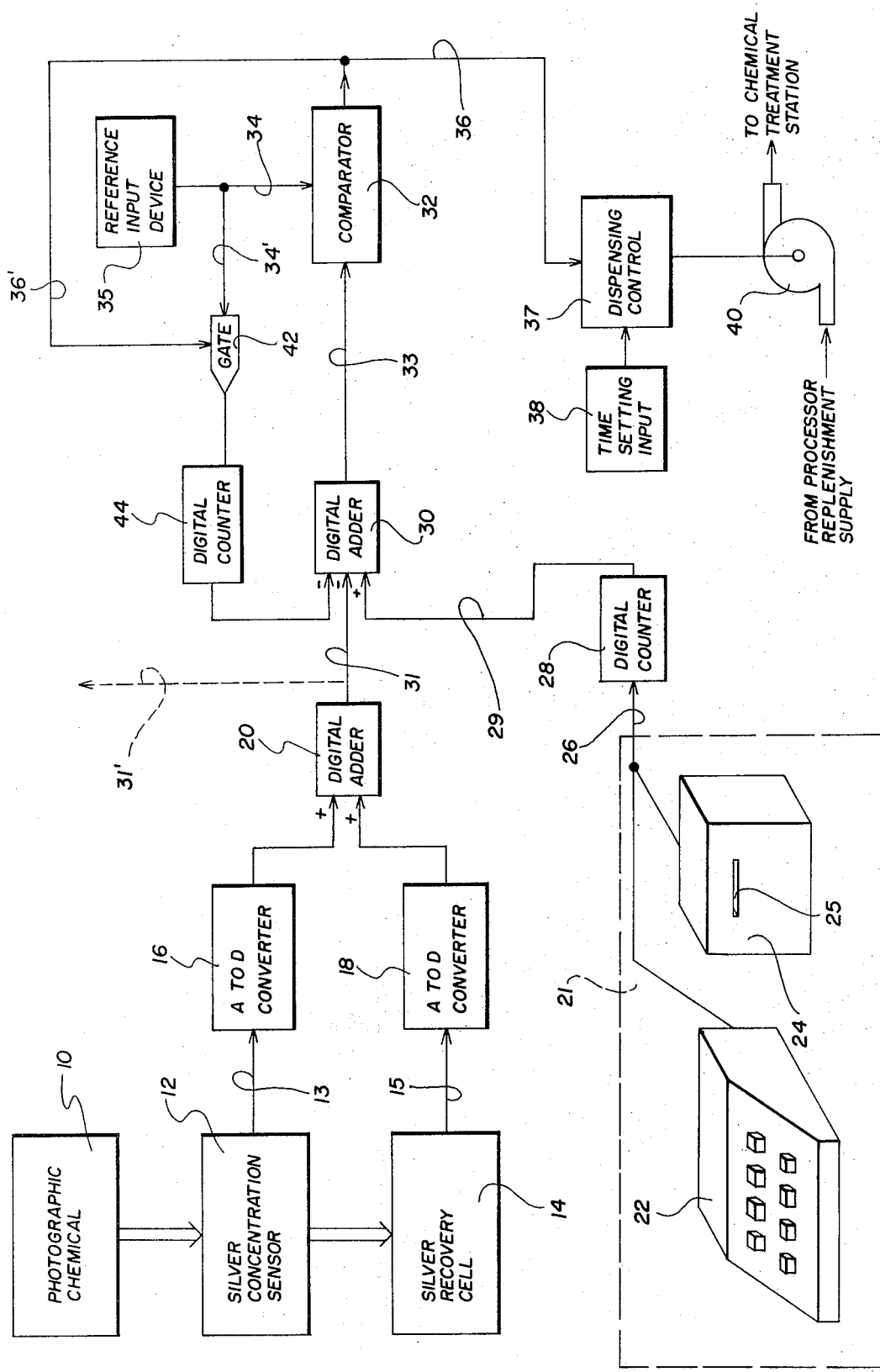

REPLENISHMENT CONTROLLER FOR PHOTOGRAPHIC PROCESSORS

BACKGROUND OF THE INVENTION

1. Field of the Invention

The present invention relates to automatic chemical replenishment control for photographic processors.

2. Background of the Invention

In modern photographic processing the duty of replenishing processing chemicals to maintain a desired level of chemical activity is increasingly being performed by automatic controllers. In addition to relieving the operator from a recurring disruption of his regular duties such automation has served to increase the accuracy of replenishment and eliminate one possibility for operator oversight.

In graphic arts processing the acceptable range of processing chemical activity is usually quite narrow. Accordingly, accurate chemical replenishment control is highly desirable, in processors intended for graphic arts applications. As a further requirement, replenishment controls for graphic arts applications must have the ability to account for the chemical demand incident to processing any of the broad selection of photographic products commonly used in graphic arts work.

Unfortunately, accurate determination of the chemical activity expended in processing and thus the replenishment demand is not easily accomplished. An ideal basis for replenishment would be the quantity of image silver in the processed photographic product but a direct measure of this quantity is not practicable. Consequently, automatic replenishment systems resort to a parameter bearing some statistical or physical relationship to the quantity of image silver, as a basis for replenishment.

Typically, prior art replenishment control devices have, as a basis for operation, either a measure of processed product area or of the degree of transparency of the processed product. Considering first the product area type of control, such devices rely on estimating the average chemical activity required per unit of product area in order to determine replenishment demand. As no straightforward relationship exists between area and activity expended, the estimates are generally based on experience, and are subject to statistical error due to the normal short term variations in the fixed silver density of the product as well as longer term estimation error in the average fixed silver density. Where a broad mix of products is processed, estimation becomes more difficult and both sources of error tend to increase, with consequential impairment of replenishment accuracy. In summary, the loose relationship between product area and chemical activity expended admits of an appreciable degree of replenishment error, a situation aggravated where a broad mix of products is processed.

In the transparency based approach, replenishment control requires a measurement of average light attenuation which is translated into an estimate of replenishment demand. Such systems assume average light attenuation is related to image silver and thus to chemical activity expended. While this assumption has validity for photographic negatives it obviously fails for such products as photographic prints. Consequently, transparency based systems for automatic replenishment are by their nature limited in the scope of products for which they are effective. Furthermore, even where only light attenuation attributable to silver is present in the product, difficulty is encountered in obtaining a valid measure of average attenuation and relating such attenuation to the chemical expended in processing.

From the foregoing discussion of the prior art, the need is seen, particularly in the case of graphic arts processors, for a chemical replenishment system which is accurate in maintaining a desired level of chemical activity and is effective regardless of the type of photographic product which is processed.

It should further be noted that more accurate replenishment in some cases results in lesser amounts of replenishment chemicals being used with attendant reduction in waste and reduced pollution potential from the processor effluent.

SUMMARY OF THE INVENTION

The present invention provides a method and apparatus for controlling chemical replenishment which is based on a determination of the image silver fixed in the processed photographic product. Hence, according to the presently preferred embodiment of the invention, accounts are maintained of (1) the silver entering the processor in the photographic product and of (2) the silver removed incident to processing as determined by a sensing device. The information regarding entering silver is compared with that regarding the silver removed to establish a demand signal representative of the silver fixed during processing. Fresh processing chemicals are dispensed responsive to the demand signal and hence replenishment is provided based on a calculated measure of the chemical expended in fixing image silver in the photographic product.

In view of the above, a primary object of this invention is to accurately control replenishment irrespective of whether a print or negative photographic product is processed.

Another object of the invention is to provide accurate control of chemical replenishment in a photographic processor by determining replenishment demand based on a calculation of the quantity of image silver in the processed photographic product.

Other objects and advantages of the invention will be set forth in or apparent from the detailed description of the presently preferred embodiment thereof found hereinafter.

BRIEF DESCRIPTION OF THE DRAWING

In the detailed description of the preferred embodiment of the invention presented below, reference is made to the accompanying drawing, in which:

The FIGURE is a schematic diagram of a replenishment controller according to this invention.

DESCRIPTION OF THE PREFERRED EMBODIMENT

During processing, the amount of some chemicals expended, such as developer, and thus the demand for their replenishment, is directly related to the image silver fixed in the photographic product. The amount of other chemicals expended, such as fixer, and thus the demand for their replenishment is inversely related to the image silver fixed in the photographic product (or directly related to the silver removed during processing). For the type of processor under consideration, the silver entering in the product becomes either image silver or non-image silver which is removed from the product during processing. It follows from basic Algebra that a relationship exists between the chemical expended, such as developer, and the difference between the silver entering and the silver removed during processing. As will become apparent in the following description, this Algebraic relationship underlies the theory of this invention.

Referring to the drawing, photographic chemical fixing solution, denoted 10, which acts to remove silver, is passed through a silver concentration sensor 12 which establishes a signal 13 representing the chemical's total silver content. Such sensors are well known in the art and a suitable sensor is described in U.S. Pat. No. 3,616,412. Where continuous silver recovery is desired, a silver recovery cell 14, providing a signal 15 indicating the quantity of silver recovered is installed in line to receive the photographic chemical 10. Silver recovery cell 14 may take various forms known in the art, a suitable apparatus being that disclosed in U.S. Pat. No. 3,616,435.

With provision for silver recovery included, the total silver removed from the product is measured in two portions. One portion includes that silver which remains in the photographic chemical 10 while the other portion includes that silver recovered from the photographic chemical by recovery cell 14.

To provide signal compatability, individual signal conversion means, such as analog to digital converters 16 and 18, are provided to convert the signals from the silver concentration sensor 12 and silver recovery cell 14, repsectively, to digital form and to effect any scaling necessary to make the signals comparable. The converted signals, each bearing information of a portion of the silver removed from the product, are transmitted from converters 16 and 18 to a digital adder 20 which maintains an account of the total silver removed during processing.

As photographic products enter the processor, the operator inputs information of the quantity of silver contained therein by means of an input device 21 such as a manual keyboard 22 or a card reader 24. Since the silver content of photographic products is carefully controlled, this information can be provided and could be made available in tabular form or on coded information bearing media. With regard to card reader 24, a precoded card (not shown) bearing information regarding the product entering the processor is inserted at a receiving slot 25 by the operator and a digital output signal 26 based on the precoded silver information is provided as an output by the reader. It should be apparent that other forms for input device 21 known in the art would be suitable for application in receiving the entering silver information.

Signals 26 from the input device 21 are transmitted to an accumulator or digital counter 28 which maintains an account of the total entering silver. A digital signal 29 bearing information regarding the quantity of entering silver is generated by digital counter 28 and is sent as a positive input to an adder 30. The output signal 31 of digital adder 20 bears information regarding the total quantity of removed silver and is transmitted to a subtractive input channel of digital adder 30. A comparator 32 is connected to receive the output 33 of digital adder 30 for comparison against a reference signal 34 established by means of a reference input device 35 such as a manual thumbwheel controlled device. When the signals match, comparator 32 generates a demand signal 36 which is transmitted to a replenishment dispensing control device 37.

The dispensing control device 37 is preferably a timer with an actuating period adjustable by means of a dial or other time setting input 38. Connected to the output of dispensing control device 37 is a replenishment dispenser 40 such as a pump which is actuated by the output signal to supply fresh chemical from the replenishment supply to the chemical treatment station.

To adjust for completed replenishment operations, the output of comparator 32 is connected to apply the demand signal 36' as a control input to a gate 42. Gate 42 is connected to also receive the signal 34' from reference input device 35 as a switched input. The output of gate 42 is connected to a digital counter 44 which maintains an account representing the total replenishment by accumulating increments equal to the reference signal each time gate 42 is opened by the demand signal, and thus each time there is a replenishment operation. Since the comparator 32 produces the demand signal upon detecting matching inputs, the reference signal is equal to the output of adder 30 at the time of replenishment. The output signal of digital counter 44 is applied to a substractive input channel of digital adder 30 and consequently the adder count is zeroed with each replenishment operation. In situations where a separate replenishment demand signal is required which is directly related to silver quantity removed from the photographic product during processing, the output 31' from adder 20 is used in logic identical to that already described herein beyond adder 30 except that the input 29 from counter 28 is deleted and the polarity of 31' is taken as positive.

Looking to the underlying algebraic relationship discussed at the beginning of this description, the output of the digital adder 30 is seen to represent the quantity of silver fixed, with an initialization each time replenishment occurs. The increments to the replenishment account occur at the time of replenishment and equal the accumulations at digital adder 30 so as to represent the quantity of silver fixed since the last replenishment. By thus incrementing counter 44, the replenishment account is caused to represent the quantity of silver fixed prior to the last replenishment. These relationships are perhaps more easily understood in algebraic equation form as follows:

Underlying Equation
$IS = ES - RS$
where
    $IS$ = Image Silver mass
    $ES$ = Entering Silver mass
    $RS$ = Removed Silver mass
also
$IS = SFP + SFS$
where
    $SFP$ = silver mass fixed prior to the last replenishment
    $SFS$ = silver mass fixed subsequent to the last replenishment Now expressing the sum taken at digital adder 30 in equation form:
$SFS = ES - RS - SFP$ The output 33 of digital adder 30 thus represents the quantity of silver fixed subsequent to the last replenishment which, through the action of comparator 32 in producing the demand signal 36, becomes the measuring parameter for replenishment demand.

At this point, the description of the presently preferred embodiment is best carried forward by considering the intended operation.

Initially, the operator introduces photographic product into the processor and inserts a precoded card bearing silver content information into slot 25 of reader 24 (or inputs the information manually by means of keyboard 22). Reader 24 translates the entering silver information from the card into a signal 26 which is transmitted to counter 28 to increment the entering silver account.

Concurrently, silver concentration sensor 12 and silver recovery cell 14 generate signals representative of removed silver which are changed to digital form by converters 16 and 18 respectively. The converted signals are summed by adder 20 which keeps the removed silver account. Digital adder 30 receives the output signals 31 from digital adder 20 and digital counters 28 and 44 which are summed together considering their respective additive or subtractive character to generate an output signal 33 representing the total silver fixed since the last replenishment operation. The output signal 33 of adder 30 is compared with the reference signal 34 from reference input device 35 and a demand signal 36 (36') is generated when the signals match. Gate 42 is opened by the demand signal 36' and the total on digital counter 44 is incremented by an amount which as a consequence of the match represents the silver fixed subsequent to the last replenishment as was discussed hereinbefore. With the incrementing of the replenishment account, digital adder 30 is zeroed for the next cycle of replenishment.

Additionally, the demand signal 36 triggers dispensing control device 37 which actuates pump 40 for a time period established by time setting input 38. Pump 40 sends fresh chemical to the chemical treatment station of the processor thus effecting a cycle of replenishment. Similarly, if separate replenishment directly related to removed silver is employed, output signal 31' initiates a logical sequence identical to that already described herein except that no input 29 is added and the polarity of 31' is reversed to positive.

Although the invention has been described in detail with respect to an exemplary embodiment thereof, it will be understood by those of ordinary skill in the art that variations and modifications may be effected within the scope and spirit of the invention.

I claim:

1. A replenishment controller for use in a photographic processor which employs chemicals which are expended through processing silver sensitized product and includes a dispenser responsive to an actuating signal, for replenishing said chemical, said controller comprising:
    a. means for directly sensing the quantity of silver which is removed from the product and producing a signal representative of the quantity of silver so removed;
    b. means for producing a signal representing the silver in the product entering said processor;
    c. means for producing a signal representative of the image silver in the processed product determined by taking the difference between the entering silver signal and the removed silver signal; and
    d. means for actuating said dispenser to effect chemical replenishment in accordance with said signal representative of image silver signal in the processed product.

2. The apparatus of claim 1 wherein said means for actuating said dispenser to effect chemical replenishment is rendered operative when said signal representative of image silver in the processed product exceeds a predetermined value.

3. A replenishment controller according to claim 1 wherein said actuating means includes means for establishing a demand reference signal and means for comparing said removed silver signal and said demand reference signal and actuating the replenishment dispenser upon detecting a predetermined relationship therebetween to effect chemical replenishment.

4. A method for controlling replenishment of chemicals in a processor intended for silver sensitized photographic product which processor includes a chemical dispenser responsive to an actuating signal, said method comprising:
    a. maintaining an account of silver entering the processor in the product;
    b. maintaining directly an account of silver removed from the product;
    c. calculating the difference between the entering silver account and the removed silver account to produce a demand signal; and
    d. actuating said dispenser in accordance with said demand signal to thereby effect chemical replenishment.

* * * * *